United States Patent
Osborne et al.

(10) Patent No.: US 6,615,964 B2
(45) Date of Patent: Sep. 9, 2003

(54) FRICTION MEMBER FOR A BRAKE AND CLUTCH

(75) Inventors: Christopher M. Osborne, Hillsborough, NC (US); Jeffrey A. Wians, Mebane, NC (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,448

(22) Filed: Sep. 6, 2001

(65) Prior Publication Data

US 2002/0027054 A1 Mar. 7, 2002

Related U.S. Application Data

(63) Continuation-in-part of application No. 09/628,447, filed on Jul. 28, 2000.

(51) Int. Cl.[7] .................................. F16D 67/02
(52) U.S. Cl. .................. 192/18 R; 192/14; 192/107 M; 56/11.3
(58) Field of Search ............... 192/18 R, 66.2, 192/14, 12 R, 66.22, 107 M; 56/11.3

(56) References Cited

U.S. PATENT DOCUMENTS

| | | | | |
|---|---|---|---|---|
| 3,936,552 A | * | 2/1976 | Krupp et al. | 428/66.2 |
| 3,994,376 A | * | 11/1976 | Fulghum | 192/223.3 |
| 4,205,509 A | * | 6/1980 | Miyazawa et al. | 56/11.3 |
| 4,306,405 A | * | 12/1981 | Fleigle | 56/11.3 |
| 4,322,935 A | | 4/1982 | Poehlman | 56/11.3 |
| 4,333,303 A | * | 6/1982 | Plamper | 56/11.3 |
| 4,351,424 A | * | 9/1982 | Lawrence et al. | 192/18 R |
| 4,369,616 A | * | 1/1983 | Cody et al. | 56/11.3 |
| 4,372,433 A | * | 2/1983 | Mitchell et al. | 192/18 R |
| 4,466,233 A | * | 8/1984 | Thesman | 56/11.3 |
| 4,513,848 A | | 4/1985 | Lo | |
| RE32,202 E | | 7/1986 | Cody et al. | 56/11.3 |
| 4,730,710 A | * | 3/1988 | Granitz | 192/18 R |
| 5,033,595 A | | 7/1991 | Pardee | 192/18 R |
| 5,407,400 A | * | 4/1995 | Thomas et al. | 477/21 |
| 5,549,186 A | | 8/1996 | Pardee | 192/18 R |
| 5,581,985 A | | 12/1996 | Secosky | 56/10.3 |
| 6,202,820 B1 | * | 3/2001 | Peinemann et al. | 192/107 M |

FOREIGN PATENT DOCUMENTS

| | | |
|---|---|---|
| DE | 31 16 673 | 2/1982 |
| WO | 02/09496 | 2/2002 |

* cited by examiner

*Primary Examiner*—Saul Rodriquez
(74) *Attorney, Agent, or Firm*—Morgan, Lewis & Bockius LLP.; Mark E. Duell

(57) ABSTRACT

A friction coupling includes a friction member including a brake surface and a clutch surface in a different plane from the brake surface; a spring abutting the friction member; a brake member proximate to the brake surface; the brake member mounted relative to the friction member to permit relative rotation; and a brake actuator connected to the brake member. The friction member can include an insert.

25 Claims, 13 Drawing Sheets

FRICTION MEMBER FOR A BRAKE AND CLUTCH

This is a continuation-in-part of copending application application Ser. No. 09/628,447 filed on Jul. 28, 2000.

BACKGROUND OF THE INVENTION

1. Field of the Invention

The present invention relates to power equipment, including but not limited to mowers, tillers, snow blowers, and tractors, and more particularly, to a brake and clutch for power equipment.

2. Discussion of Related Art

Conventional power equipment can include a clutch that selectively engages the driven implement with the engine output member. A brake that retards the rotation of the driven implement when the driven implement is disengaged from the engine output member might also be included. The combination of these two coupling devices permits the operator to control the movement of the driven implement without altering the operation of the engine output member.

In known power equipment, the components utilized in the clutch are separate and distinct from those employed by the brake. This arrangement requires a large number of parts for assembly as well as for replacement under routine maintenance. This routine maintenance is further hampered by the need to disassemble a relatively large number of parts to gain access to and/or replace the worn or broken part(s). Further, providing the brake and clutch as separate components requires a large packaging size to contain these components.

Dimensional constraints are another drawback of conventional blade brake and clutch designs. A large surface area is desirable for both the brake and the clutch. However, packaging space often constricts these areas below their optimum values.

SUMMARY OF THE INVENTION

Accordingly, the present invention is directed to a friction coupling that substantially obviates one or more of the problems due to limitations and disadvantages of the related art. Additional features and advantages of the invention will be set forth in the description which follows, and in part will be apparent from the description and claims hereof as well as the appended drawings.

To achieve these and other advantages and in accordance with the purpose of the present invention, as embodied and broadly described, a torque transmitting element for use in an apparatus driven by a prime mover includes a friction element and an insert. The friction elements includes a first friction engagement surface, a second friction engagement surface in a different plane from the first friction surface, a third surface and at least one torque transmitter on the third surface. The insert is secured to the friction element between the third surface and one of the first friction surface and the second friction surface.

In a another aspect, a brake and clutch assembly for a power apparatus includes an engine output member, a driven member and a coupling having a first position and a second position. The coupling includes a friction member connected to one of the engine output member and the driven member. The friction member includes a brake surface and a clutch surface in a different plane from the brake surface and an insert disposed intermediate the clutch surface and the brake surface. The coupling also includes a spring, a brake member and a brake actuator. The spring is located between the friction member and the one of the engine output member and the driven member. The brake member is proximate to the brake surface and is mounted relative to the friction member to permit relative rotation. The brake actuator is connected to the brake member. The clutch surface is disengaged from the other one of the engine output member and the driven member and the brake member is engaged with the brake surface when the coupling is in the first position and the clutch surface is engaged with the other one of the engine output member and the driven member and the brake member is disengaged from the brake surface when the coupling is in the second position.

In a further aspect, a torque transmitting element for use in an apparatus driven by a prime mover includes a friction element. The friction element includes a first friction engagement surface, a second friction engagement surface in a different plane from the first friction surface, a third surface and at least one torque transmitter is on the third surface. The friction member also includes means for reinforcing the transmission of torque from at least one of the first and second friction engagement surfaces is secured to the friction element between the third surface and the at least one of the first friction surface and the second friction surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute part of this specification, illustrate an embodiment of the invention and together with the description serve to explain the principles of the invention.

DETAILED DESCRIPTION OF PREFERRED EMBODIMENTS

Reference will now be made in detail to preferred embodiments of the present invention, examples of which are illustrated in the accompanying drawings.

Figure 1:
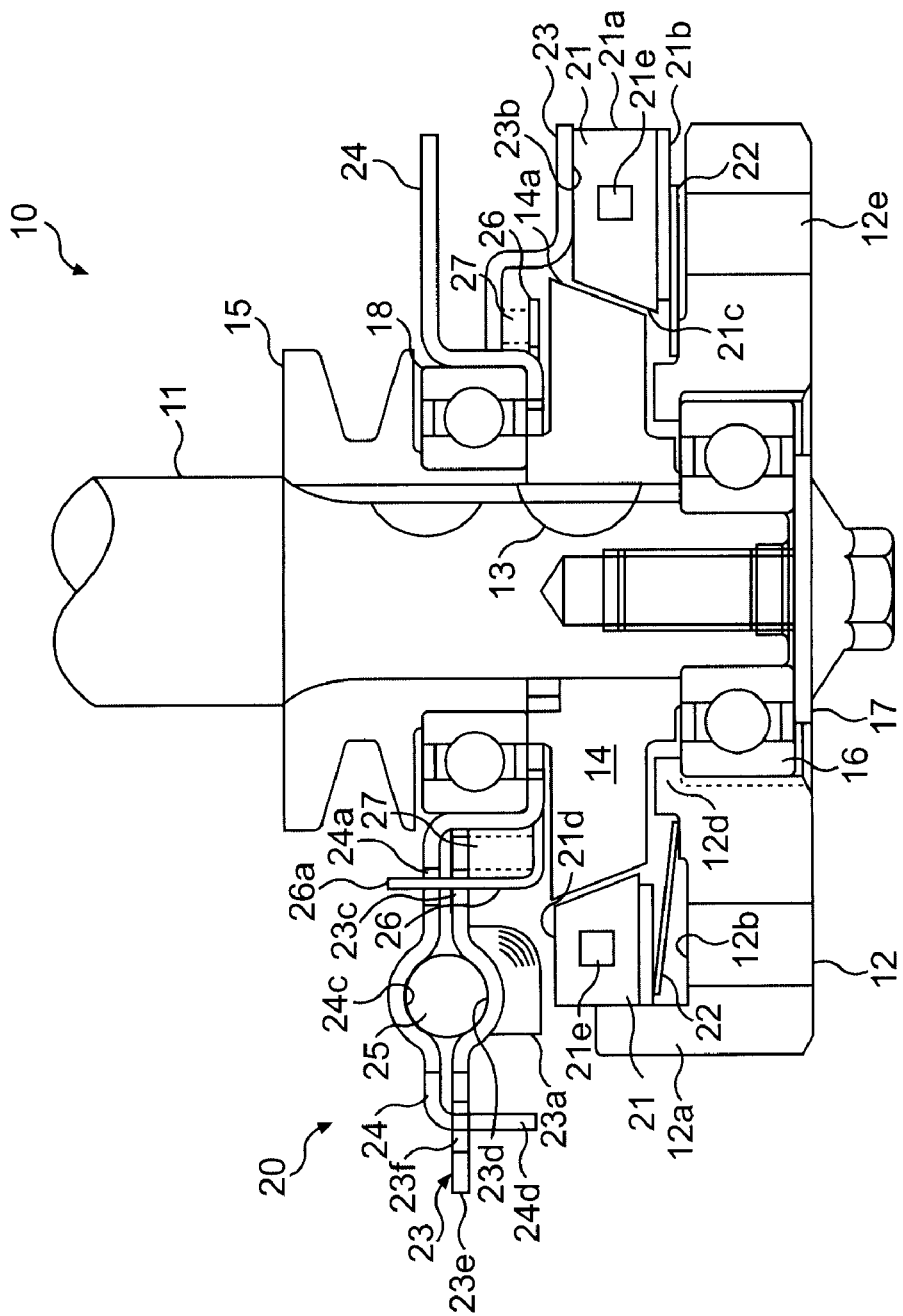
FIG. 1 is a cross-sectional view of a blade brake and clutch.
Figure 2:
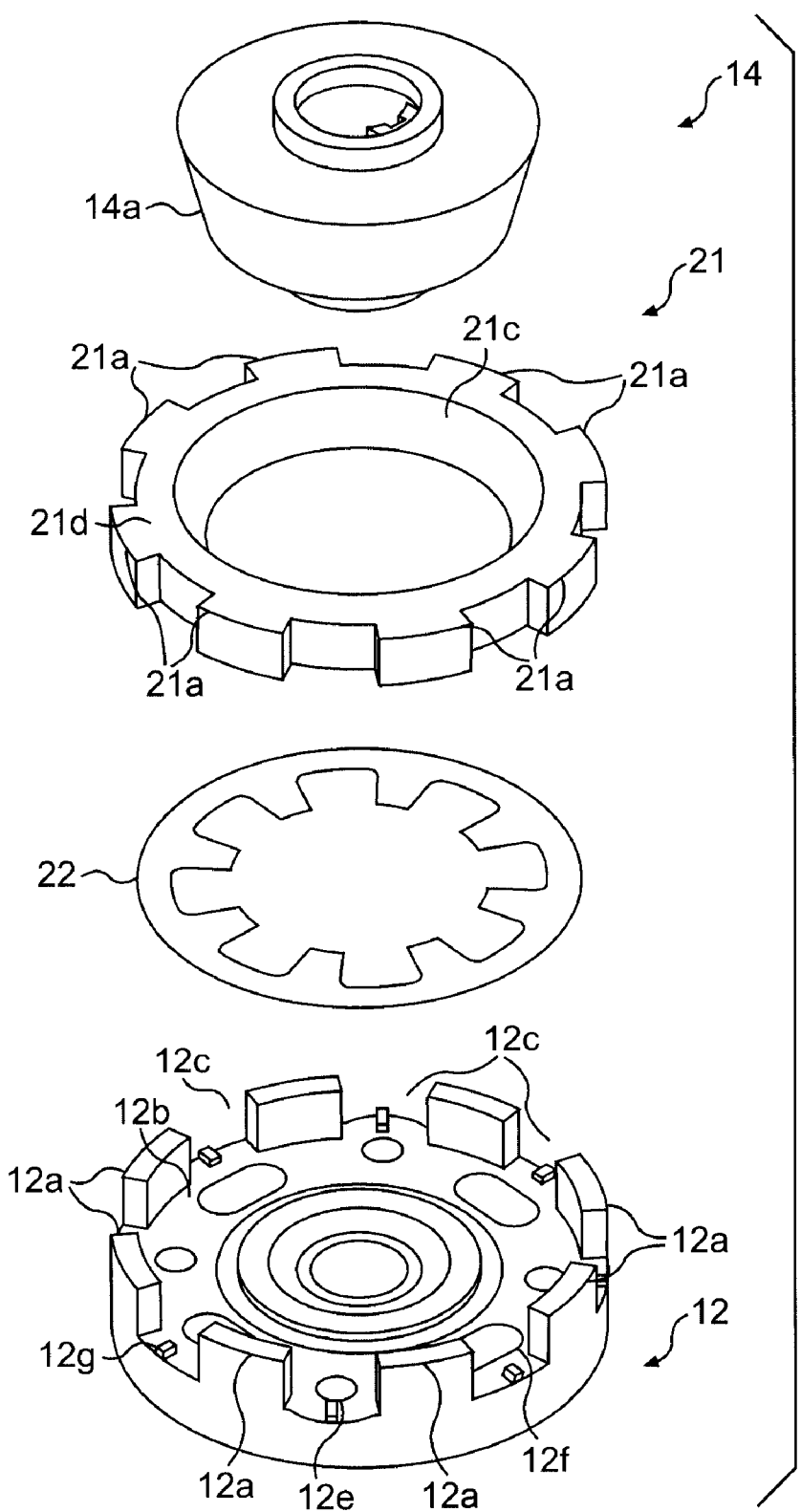
FIG. 2 is an exploded view of a portion of the blade brake and clutch assembly of FIG. 1.
Figure 3:
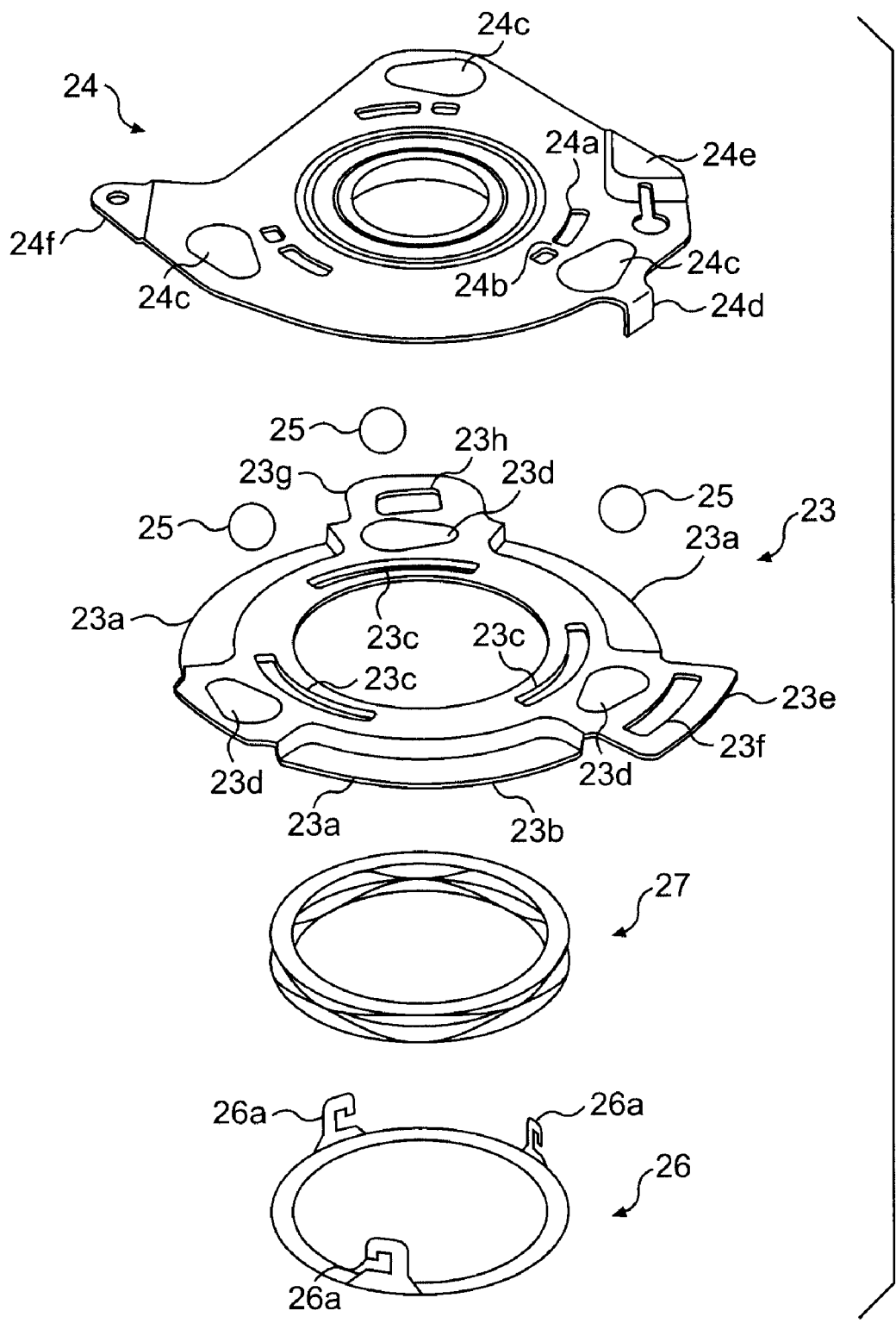
FIG. 3 is an exploded view of another portion of the blade brake and clutch assembly of FIG. 1.

FIGS. 1–3 illustrate a drive assembly 10 including a driving member 11, a driven member 12 and a coupling 20 selectively connecting the driving member 11 to the driven member 12. The driving member 11 can be a shaft connected to a lawn mower engine (not shown). The driven member 12 can be a blade holder adapted to carry a mower blade (not shown).

A key 13 fixes a drive hub 14 to the driving member 11 in a conventional manner. A power take-off pulley 15 is connected to the driving member 11 in a conventional manner. A bearing assembly 16 mounts the driven member 12 on the driving member 11. The bearing is axially restrained on the driving member 11 between a flanged bolt 17 secured to the driving member 11 and the drive hub 14. The bearing assembly 16 permits the driving member 11 to rotate relative to the driven member 12, as will be discussed later.

Alternatively, the drive hub 14 and the power take-off pulley 15 can be secured to the driving member 11 by other mechanical connections such as a built-in key, a tongue and groove, splines or a snap ring. The drive hub 14 and the power take-off pulley 15 can also be integrally formed with the driving member 11. The bearing assembly 16 can be secured by a press-fit or staking it to either one or both of the driving member 11 and the driven member 12 or other similar means can be used.

The driven member 12 is annular and has a plurality of projections 12a spaced along its circumference. These projections 12a extend axially from an upper face 12b of the driven member 12. Axial projections 12a adjacent one another define a space 12c between them. The driven member 12 is axially located on the bearing 16 by an annular flange 12d. Alternatively, a washer or other similar means can locate the driven member 12 on the bearing 16. A plurality of threaded holes 12e are circumferentially spaced about the driven member. An implement, such as a blade (not shown), can be secured to the driven member 12 via bolts (not shown) inserted in the threaded holes 12e. A plurality of through holes 12f (FIG. 2) can be provided in the driven member 12 to facilitate removal of any debris, such as grass clippings and dirt. A stopper 12g (FIG. 2) can be provided on the upper surface 12b of the driven member 12 in at least one of the spaces 12c. This stopper 12g can be configured as a rib or other suitable shape.

The coupling 20 includes a friction member 21, a Belleville spring 22, a brake member 23, a brake actuator 24, a plurality of balls 25, a retainer 26 and a compression spring 27. The compression spring 27 is configured to be compressible to a very small axial thickness. Only one compression spring 27 is necessary in the preferred embodiment of the coupling 20. This permits a compact assembly and minimizes the number of parts.

The coupling 20 is configured to simultaneously displace the brake member 23 and the friction member 21 between respective engaged and disengaged positions, as will be discussed in more detail. It is noted that the right half of FIG. 1 represents the coupling 20 in a first configuration and the left half of FIG. 1 represents the coupling 20 in a second configuration.

The friction member 21 has a plurality of radially extending projections 21a spaced along its circumference. Each radial projection 21a extends into a corresponding one of the spaces 12c and abuts the two adjacent axial projections 12a. The axial projections 12a and the radial projections 21a rotationally secure the friction member 21 to the driven member 12. The friction member 21 is a one-piece element which can be a composite including rubber, brass and graphite.

In the preferred embodiment illustrated in FIGS. 1–5, the friction member 21 has a powder metal core 21e for reinforcement. The powder metal core 21e can be provided with surface ridges to rotationally lock the powder metal core 21e within the friction member 21. This powder metal core 21e can be used because it adds strength to the friction member 21 and provides for more reliable torque transmission. The friction member 21 need not include the core 21e so long as the friction member 21 has sufficient strength to transmit the requisite torque.

The Belleville spring 22 contacts both the upper face 12b of the driven member 12 and a lower surface 21b of the friction member 21. This spring 22 biases the friction member 21 axially away from the driven member 12. The interaction of the axial projections 12a and the radial projections 21a permits the friction member 21 to be axially displaced relative to the driven member 12.

A clutch surface 21c formed on the inner circumference of a friction member 21 selectively engages a frusto-conical outer surface 14a on the drive hub 14. The clutch surface 21c is frusto-conical. Forming this clutch surface 21c as a frusto-conical surface maximizes surface area with a minimum radial dimension.

The spring 22 biases the clutch surface 21c into contact with the frusto-conical outer surface 14a of the drive hub 14. This frictional contact allows the drive hub 14 to drive the driven member 12.

A brake surface 21d is provided on the upper surface of the friction member 21. The brake surface 21d and the clutch surface 21c are provided on separate (the upper and the inside) surfaces of the friction member 21 to save space and minimize the number of elements needed for the coupling 20.

The brake member 23 has at least one brake shoe 23a, and preferably, a plurality of brake shoes 23a circumferentially spaced about its periphery. The brake shoes 23a extend axially downward from the bottom of the brake member 23. Each brake shoe 23a has a braking surface 23b that selectively engages the brake surface 21d on the friction member 21.

The brake actuator 24 is coaxially disposed above the brake member 23. A bearing assembly 18 allows the brake actuator 24 to be mounted for relative rotation on driving member 11 via the power take-off pulley 15. The bearing assembly 18 is press fit onto the power take-off pulley 15 and the brake actuator 24. Alternatively, the bearing assembly 18 can be retained by staking the bearing assembly 18 to any combination of the power take-off pulley 15, the brake actuator 24 and the drive hub 14.

The brake actuator 24 has a plurality of circumferentially spaced arcuate slots 24a. A rib 24b extends across a respective one of the arcuate slots 24a; see FIGS. 3 and 4.

A plurality of arcuate slots 23c are circumferentially spaced on the brake member 23. A portion of each brake member arcuate slot 23c overlaps a corresponding brake actuator arcuate slot 24a with the remainder extending beyond the corresponding brake actuator arcuate slot 24a The retainer 26 is a flat annular disk with a plurality of hooks 26a extending axially upward from the circumference of the retainer 26. The retainer 26 is coaxially disposed below the brake actuator 24 and radially inside of the brake shoes 23a. Each hook 26a projects through the arcuate slots 23c and 24b in the brake member 23 and the brake actuator 24. Each hook 26a is secured on a respective rib 24b.

In the preferred embodiment, the retainer 26 is coated with a low friction material, such as polytetraflouroethylene (PTFE) or nylon. This low friction coating allows for an easier return of the retainer 26 to its neutral position, as will be discussed later.

The compression spring 27 is captured between the bottom of the brake member 23 and the upper surface of retainer 26. The retainer 26 connects the brake member 23 to the brake actuator 24, and compression the spring 27 biases the brake member 23 away from the brake actuator 24.

A plurality of ball ramp assemblies form a connection between the brake member 23 and the brake actuator 24. Each ball ramp assembly comprises inclined ball ramp surfaces 23d, 24c formed in each of the brake member 23 and the brake actuator 24. The ball ramp surfaces 23d oppose the ball ramp surfaces 24c and are inclined in the opposite direction relative to the ball ramp surfaces 24c. A ball 25 is movably captured between each pair of opposed ball ramp surfaces 23d, 24c.

Figure 4:
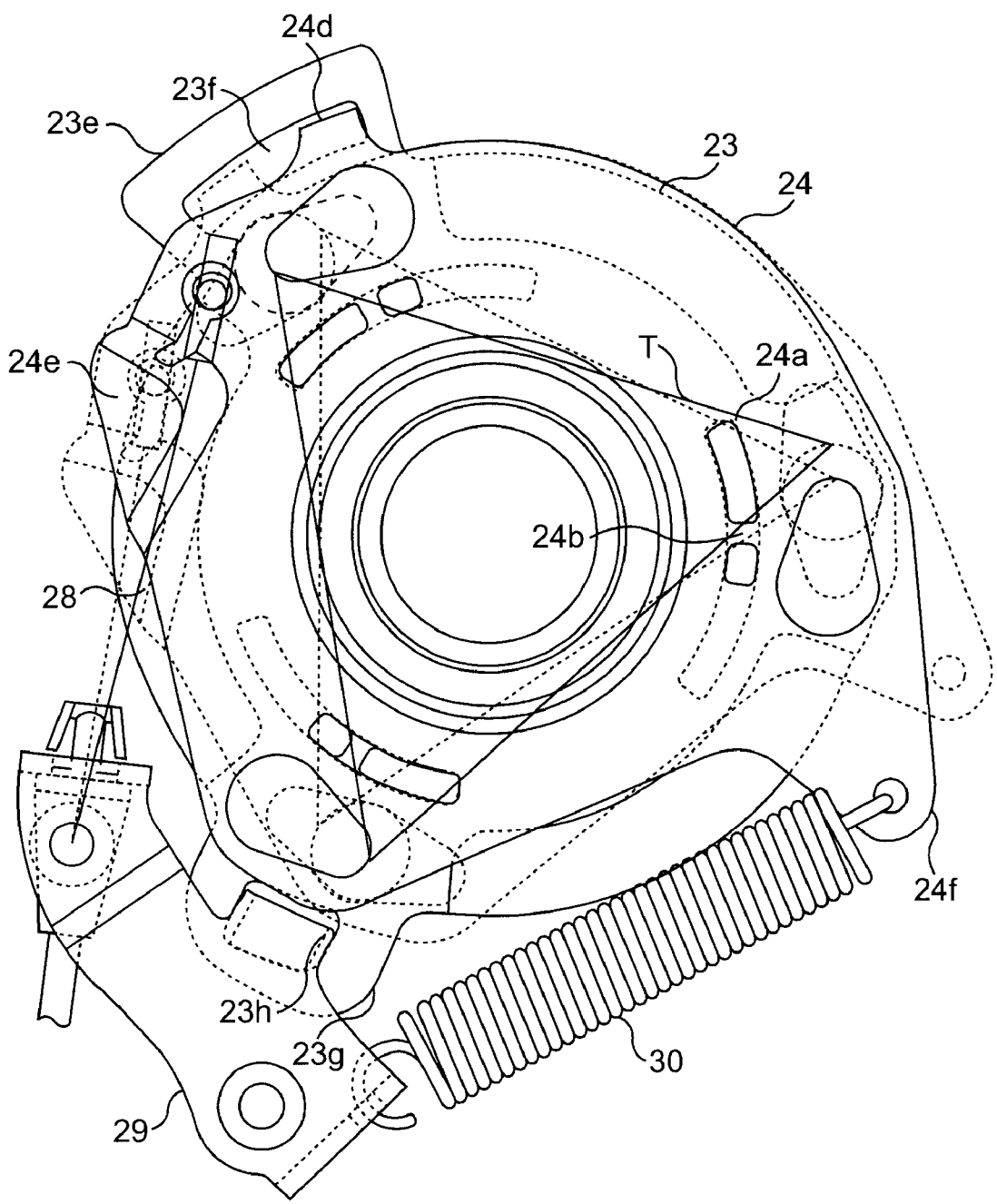
FIG. 4 is a plan view of the blade brake and clutch of FIG. 1.

Three ball ramp surface pairs can be used and located on the brake member 23 and brake actuator 24 at points of a triangle T; see FIG. 4. This triangle T is preferably an equilateral triangle but any other triangle can be used. The hooks 26a of retainer 26 are located within the perimeter of the triangle T and proximate a respective corner. This arrangement positions the hooks 26a close to the ball ramp surfaces 23d, 24c. With this arrangement, the force from the compression spring 27 is located within the triangle T. This enhances the performance of the coupling 20. However, the hooks 26a can be located in other positions.

A tab 23e extends radially from the circumference of the brake member 23. An arcuate tab slot 23f is formed in the tab 23e. The brake actuator 24 has a projection 24d that extends axially downward through the tab slot 23f. The width of the projection 24d is less than the arcuate length of the tab slot 23f.

Alternatively, other couplings that convert rotary motion to axial motion can be used instead of the ball ramp surface assembly, such as a cam and follower assembly. Other embodiments can forgo any rotary motion of the brake actuator such as a linkage system that provides a linearly displaceable link in contact with the brake member.

Figure 5:
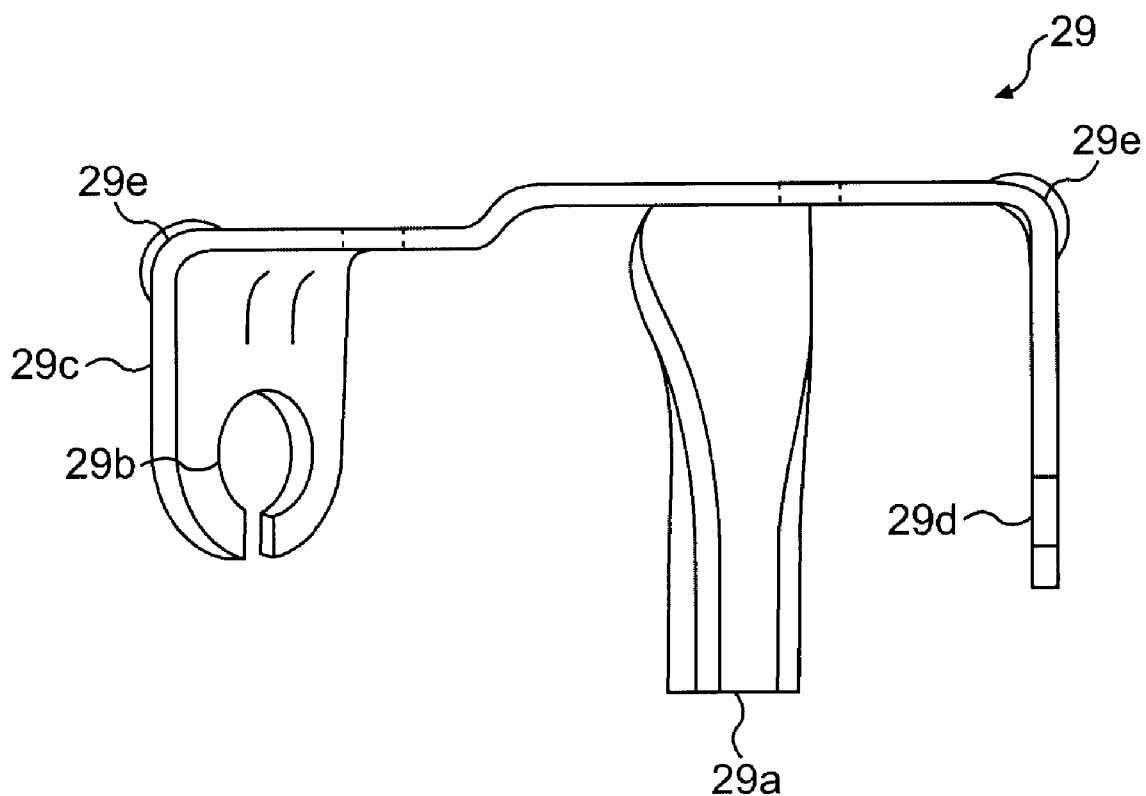
FIG. 5 is a side view of a bracket used with the blade brake and clutch of FIG. 1.

Referring to FIGS. 4 and 5, a bracket 29 is secured to a bracket tab 23g on the brake member 23 by a post 29a. The post 29a extends axially downward through an opening 23h in the bracket tab 23g. The brake member 23 is free to move axially along the post 29a. The bracket 29 can be secured to a mounting surface, such as a mower deck or an engine block, by bolts or other suitable fastening arrangement. Thus, the bracket 29 rotationally fixes the brake member 23. Alternatively, the brake member 23 can be rotationally secured by a bolt or other similar fastening arrangement.

The bracket 29 includes a hole 29b formed in a guide flange 29c. A projection 24e extends axially upward from the top surface of the brake actuator 24. One end of a control cable 28 passes through the hole 29b in the guide flange 29c and is secured to the 24e projection by way of a slot or a hole or any other similar manner. The other end of the control cable 28 is secured to a control handle (not shown). Alternatively, the control cable 28 can be secured at one end to a hole in the brake actuator 24.

A coil spring 30 is secured at one end to the bracket 29 at a recess 29d. The other end of the coil spring 30 is secured to a spring tab 24f formed at the periphery of the brake actuator 24. The recess 29d could be placed by a hole in an alternate embodiment.

The bracket 29 can include a plurality of ribs 29e to assist in the support the guide flange 29c and the flange containing the recess 29d. However, the bracket 29 does not need to be provided with these ribs 29e.

The bracket 29 is a single element providing the functions of rotationally fixing the brake member 23, anchoring the control cable 28 and anchoring the coil spring 30. The preferred embodiment of the bracket 29, therefore, contributes to the reduction of parts for assembly.

Operation of the brake and clutch of the invention will now be described with reference to FIGS. 1 and 4.

Actuation of the control cable 28 imparts a rotary motion to the brake actuator 24. This, in turn, causes each ball ramp surface 24c to move relative to the associated ball 25. The ball 25 rolls along the oppositely inclined ball ramp surface 23d. This motion of the ball forces the brake member 23 axially downward against the bias of the compression spring 27 to engage the braking surface 23b with the brake surface 21d. Further rotation of the brake actuator 24 by displacement of the control cable 28 causes the braking surface 23b to axially displace the friction member 21 axially downward toward the driven member 12 against the bias of the Belleville spring 22. This downward movement of the friction member 21 gradually disengages the clutch surface 21c from the frusto-conical surface 14a of the drive hub. This motion eventually completely disengages the driven member 12 from the driving member 11 and retards the rotation of the driven member 12. At this point, the stopper 12g is engaged by the bottom surface 21b of the friction member. This configuration is illustrated in the right half of FIG. 1.

Actuation of the control cable 28 in the opposite direction rotates the brake actuator 24 in the opposite direction, which, in turn, displaces the brake member 23 upward from the friction member 21. This motion gradually disengages the braking surface 23b from the brake surface 21d of the friction member 21. Simultaneously, the clutch surface 21c is gradually brought into engagement with the frusto-conical surface 14a due to the bias of the Belleville spring 22. This motion eventually completely engages the driven member 12 with the driving member 11 and completely disengages the braking surface 23b from the brake surface 21d. This configuration is illustrated in the left half of FIG. 1.

Rotation of the brake actuator 24 relative to the brake member 23 is limited by the interaction of the tab slot 24d with tab slot 23f. One end of the tab slot 23f defines a first limit of the brake actuator 24 and the other end of the tab slot 23f defines a second limit of the brake actuator. When the brake actuator is in the first limit position, the clutch surface 21c is disengaged from the frusto-conical surface 14a and the braking surface 23b is engaged with the brake surface 21d. When the brake actuator is in the second limit position, the clutch surface 21c is engaged with the frusto-conical surface 14a and the braking surface 23b is disengaged from the brake surface 21d.

The force exerted by the coil spring 30 is directed on the brake actuator in such a manner as to overcome the bias of both of the compression spring 27 and the Belleville spring 22. Thus, the coil spring 30 biases the brake actuator 24 towards the first limit position. This ensures that the driven member 12 is disengaged from the driving member 11 and that the brake member 23 holds the driven member against rotation until an operator provides input to the brake actuator 24.

Other embodiments of the various elements described herein can be utilized in accordance with the present invention. For example, the brake surface could be formed on the lower radial face of the friction member. Another embodiment of the friction member could locate the brake surface on the outer circumference of the friction as a frusto-conical and the clutch surface could be formed on either radial face of the friction member. The location of the brake member and the brake actuator can be on either side of the friction member so long as the Belleville spring is on the opposite side of the friction member. The friction member alternatively could be secured to the driving member in any of the configurations described above. The control cable can be replaced by a rigid link secured at one end to the brake actuator and connected at the other end to the control handle by a linkage.

Other embodiments of the friction member 21 also can be utilized in accordance with the invention. For example, as described and shown previously, friction member 21 can include reinforcement (e.g., powder metal core 21e), which is rotationally locked with the friction member 21 (e.g., providing the powder metal core 21e with surface ridges). In the following, additional embodiments of this friction member 21 are described.

Figure 12:
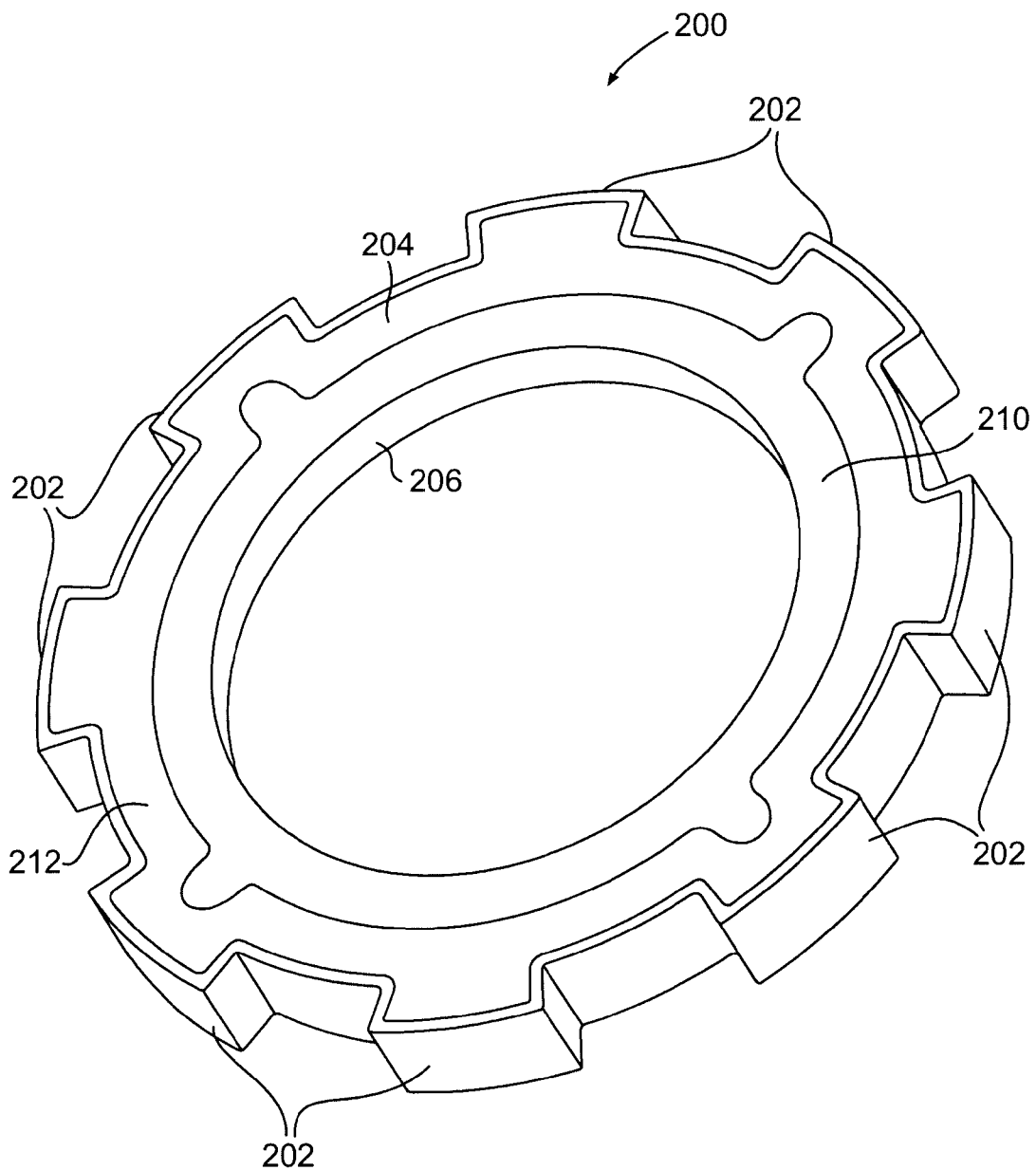
FIG. 12 is a bottom perspective view of another preferred embodiment of the friction member.
Figure 13:
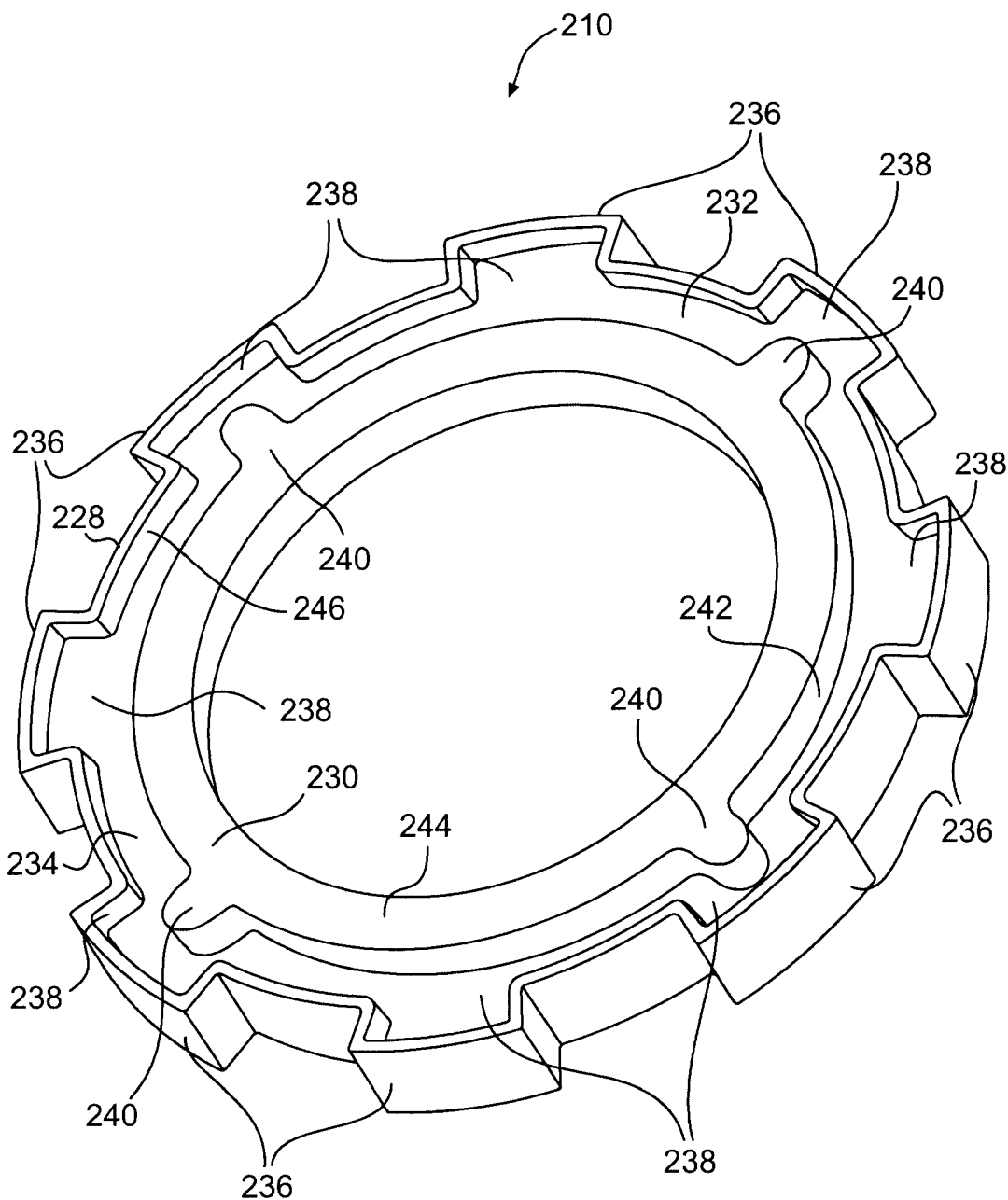
FIG. 13 is a bottom perspective view of the friction element of FIG. 12.
Figure 14:
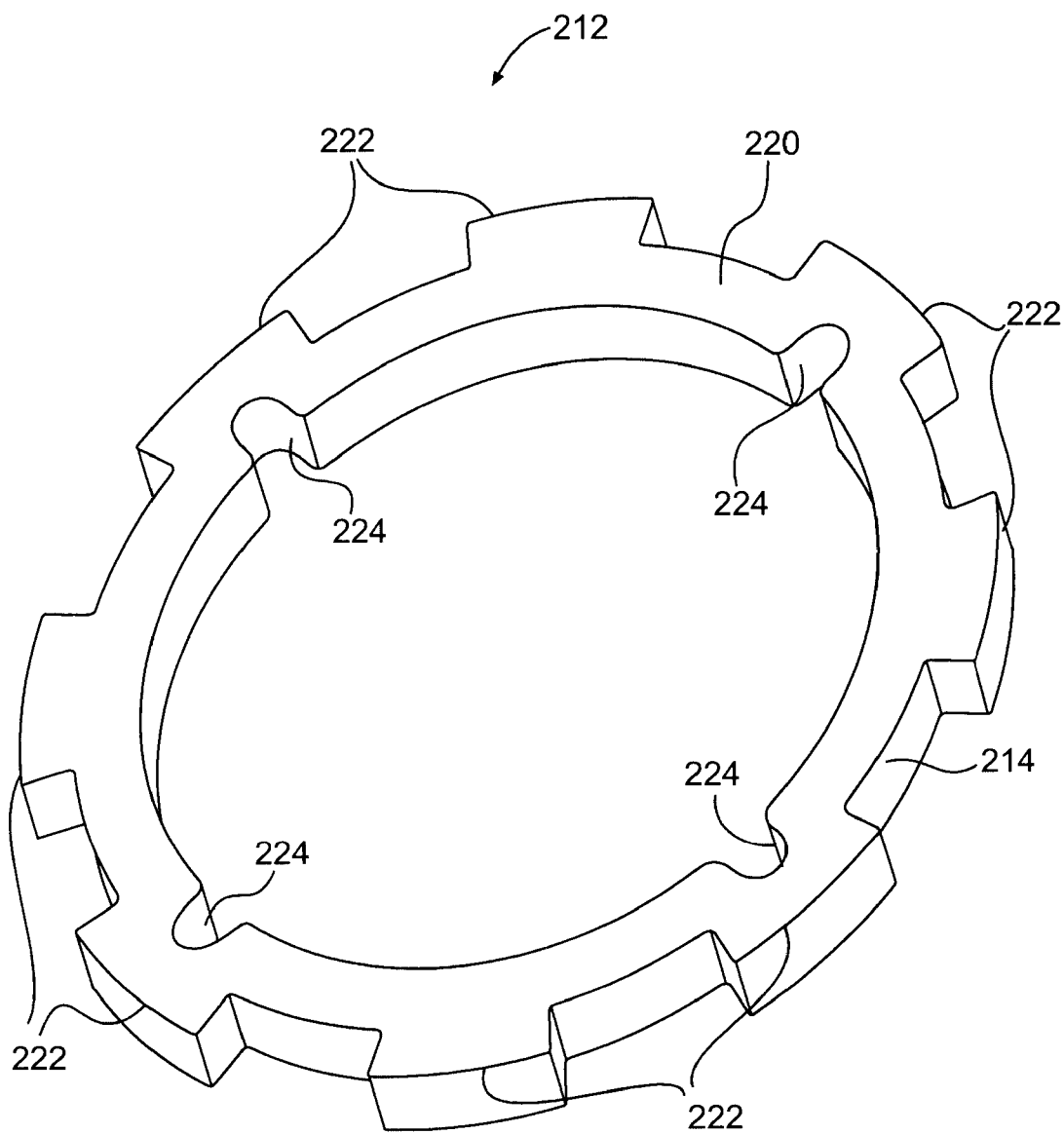
FIG. 14 is a bottom perspective view of the insert shown in FIG. 12.

FIGS. 6–11 show an embodiment of a friction member referred to by reference numeral 100. FIGS. 12–14 show another embodiment of the friction member referred to by reference numeral 200. Both friction members 100 and 200 are shown as being of the type to interact with the driving member 11, the driven member 12 and the brake member 23 in the same manner as the friction member 21 described above with reference to FIGS. 1–5. Accordingly, in the following discussion, reference is made to the driving member 11, the driven member 12 and the brake member 23 of the preferred embodiment illustrated in FIGS. 1–5 and described above.

Figure 6:
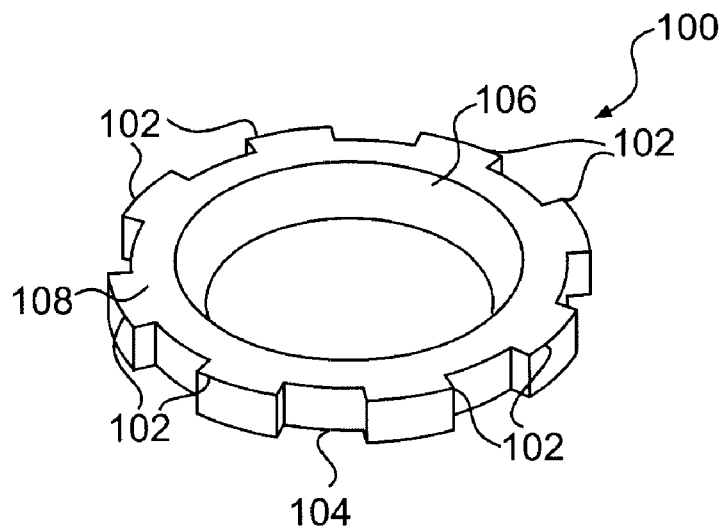
FIG. 6 is a perspective view of another preferred embodiment of a friction member.
Figure 7:
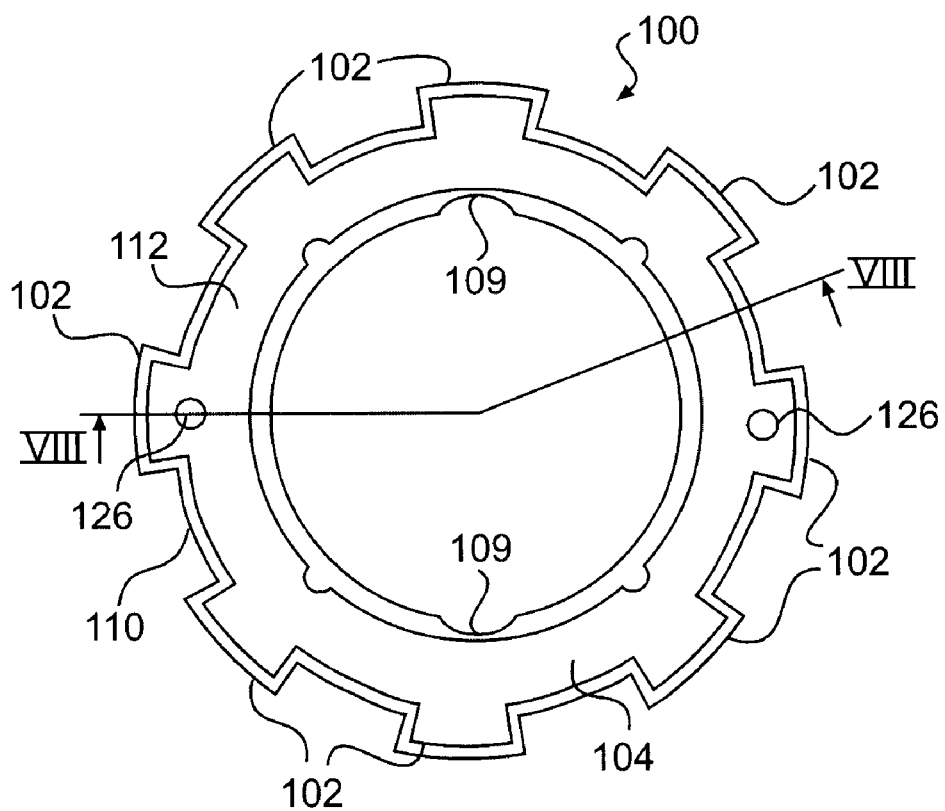
FIG. 7 is a bottom plan view of the friction member shown in FIG. 6.
Figure 8:
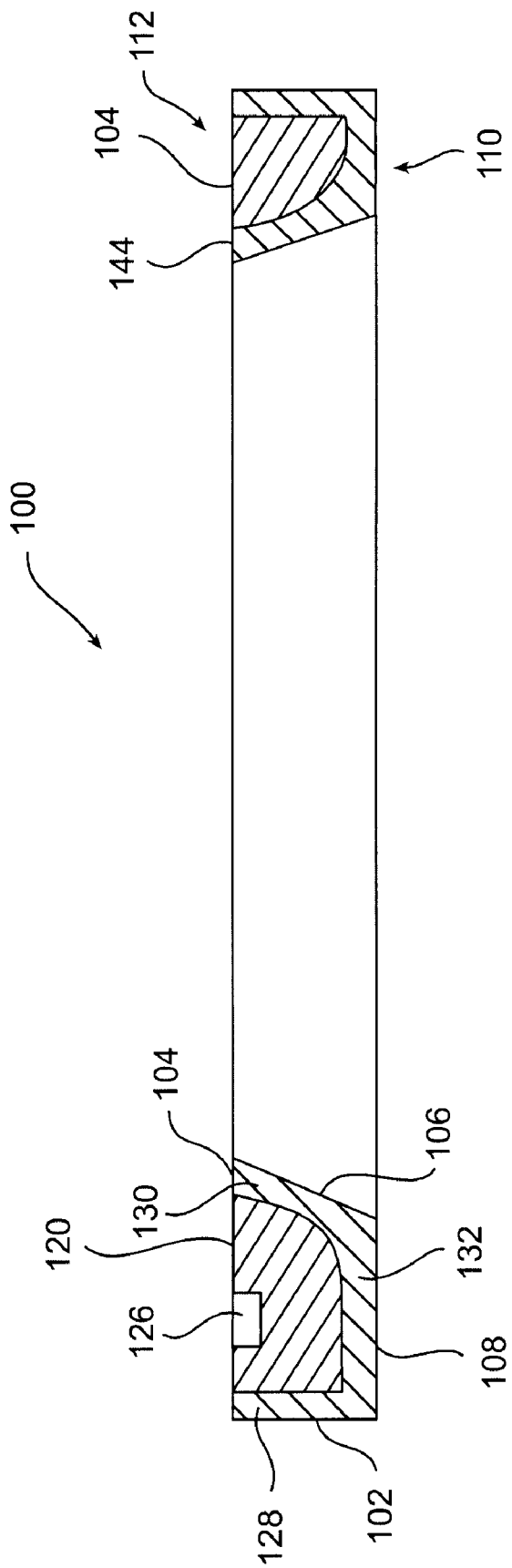
FIG. 8 is a cross-sectional view taken along VIII—VIII of FIG. 7.

Referring now to friction member 100, FIGS. 6 and 7 show the top perspective view and the bottom view of the friction member 100, respectively. FIG. 8 is a cross-sectional view through VIII—VIII of FIG. 7. Like friction member 21 discussed previously, the friction member 100 has a plurality of radially extending projections 102 spaced along its circumference, a lower surface 104, a clutch surface 106 and a brake surface 108. When used with the coupling described above with reference to FIGS. 1–5, each of the plurality of radially extending projections 102 extends into a corresponding one of the spaces 12c and abuts the two adjacent axial projections 12a on the driven member 12. The axial projections 12a and the radial projections 102 rotationally secure the friction member 100 to the driven member 12.

During operation, the frictional engagement between the clutch surface 106 and the drive hub 14 and the frictional engagement between the brake surface 108 and the brake shoes 23a wears away material from the friction member 100 and creates friction material dust. This dust can cause glazing on the clutch surface 106 and the brake surface 108, which reduces the torque transmitting ability of the friction member 100. Two dust removal grooves 109 can be formed in the clutch surface 106 to collect and remove the friction material dust from the coupling. Air flowing through the dust removal grooves 109 forces the collected friction material dust out of the coupling. The dust removal grooves 109 can be omitted where the amount of dust created is small or the glazing caused by the cannot adversely affect the ability of the friction member 100 to transmit the requisite torque.

The Belleville spring 22 contacts both the upper face 12b of the driven member 12 and a lower surface 104 of the friction member 100. This spring 22 biases the friction member 100 axially away from the driven member 12. The interaction of the axial projections 12a and the radial projections 102 permits the friction member 100 to be axially displaced relative to the driven member 12.

The clutch surface 106 provided on the inner circumference of the friction member 100 selectively engages the frusto-conical outer surface 14a on the drive hub 14. The clutch surface 106 also is frusto-conical. Forming this clutch surface 106 as a frusto-conical surface maximizes surface area with a minimum radial dimension. The spring 22 biases the clutch surface 106 into contact with the frusto-conical outer surface 14a of the drive hub 14. This frictional contact allows the drive hub 14 to drive the driven member 12, as discussed above with reference to FIGS. 1–5.

The brake surface 108 is provided on the upper surface of the friction member 100. The brake surface 108 and the clutch surface 106 are provided on separate (the upper and the inside) surfaces of the friction member 100 to save space and minimize the number of elements needed for the coupling. Each braking surface shoe 23b of the brake member 23 selectively engages the brake surface 108 on the friction member 100 to retard the motion of the driven member 12 when the clutch surface 106 disengages from the hub drive 14, as discussed above with reference to FIGS. 1–5.

As shown in FIGS. 7–10, the friction member 100 includes a friction element 110 and a core or insert 112 to reinforce the friction member 100 and increase its torque transmitting capabilities. As will be discussed in detail below, the friction element 110 and the insert 112 are preferably configured to matingly engage with one another to rotationally interlock the insert 112 and the friction element 110. In this embodiment, friction the element 110 and the insert 112 are interlocked by way of corresponding mating surfaces, specifically, recesses 138 and ribs 140 on the friction element 110 and projections 122 and grooves 124 on the insert 112, as discussed in more detail below.

Figure 9:
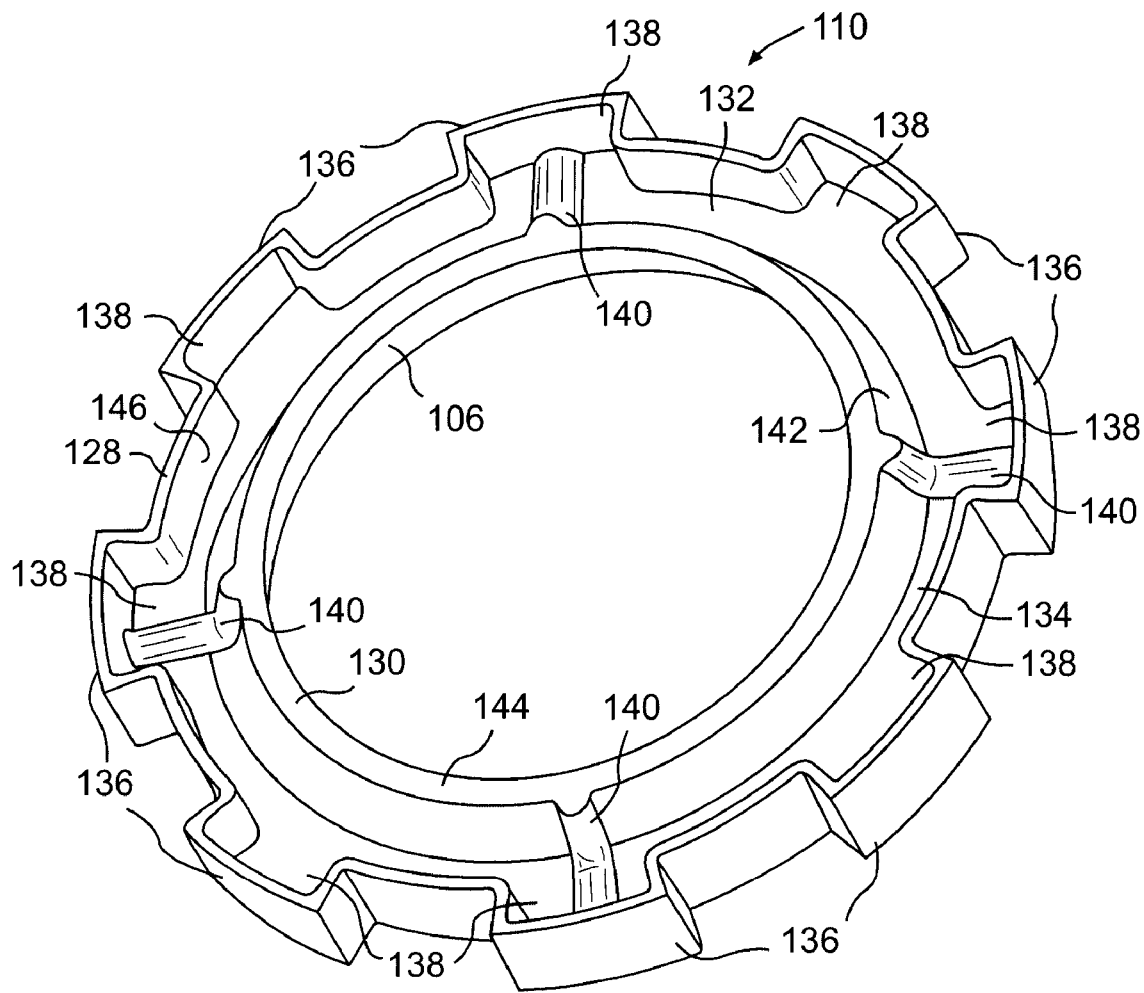
FIG. 9 is a bottom perspective view of the friction element shown in FIG. 6.

FIG. 9 illustrates the friction element 110 without the insert 112. The friction element 110 can be in the form of a lining secured to the insert 112. The friction element 110 is preferably a one-piece part including an outer circumferential wall 128, an inner circumferential wall 130 and a radial wall 132 connecting the outer and inner circumferential walls 128, 130. The outer circumferential wall 128 includes the outer circumferential surface 114 of the friction member 100 and the inner circumferential wall 130 includes the clutch surface 106 of the friction member 100. The radial wall 132 includes the brake surface 108 of the friction member 100. Preferably, the channel surface 146 of the outer circumferential wall 128 is cylindrical, but other shapes are possible, such as frusto-conical, undulating, curved or linear. Preferably, the channel surface 142 of the inner circumferential wall 130 is frusto-conical, but other shapes are possible, such as cylindrical, undulating, ovoid or octagonal.

The inner and outer circumferential walls 128, 130 and the radial wall 132 define a channel 134. The insert 112 is disposed in the channel 134, as will be discussed below. A plurality of radial extensions 136 are spaced about the outer circumference of the friction element 110. The extensions 136 are hollow and form a recess 138. A plurality of ribs 140 are formed on the friction element 110 and extend from the channel surface 142 of the inner circumferential wall 130 across the radial wall 132 and into the recess 138. The recesses 138 and the ribs 140 mechanically engage corresponding structure on the insert 112 to rotationally interlock the insert 112 to the friction element 110, as explained detail below. Although the number of ribs 140 as compared to the number of recesses 138 can vary, in this preferred embodiment the number of ribs 140 is less than the number recesses 138. Each rib 140 is aligned with its respective recess 138.

The friction element 110 can be made of a composite friction material including rubber, brass and graphite bonded by an adhesive. For example, commercially available friction material such as Scan-Pac RF47 manufactured by Scan-Pac Mfg., Inc. of Mequon, Wis. can be used. Other materials offering sufficient friction coefficients, wear resistance and heat resistance can also be used.

Because the friction material of the preferred embodiment includes rubber, the extensions 136 function as vibration dampers to absorb the torsional vibration between the drive hub 14 and the driven member 12. As discussed above, the extensions 136 and the mating projections 122, which form the radially extending projections 102 on the friction member 100, transmit torque to the axial projections 12a of the driven member by the positive engagement with the axial projections 12a, not by frictional engagement. Therefore, the extensions 136 can be omitted where torsional vibration damping is unnecessary or not desired.

Figure 10:
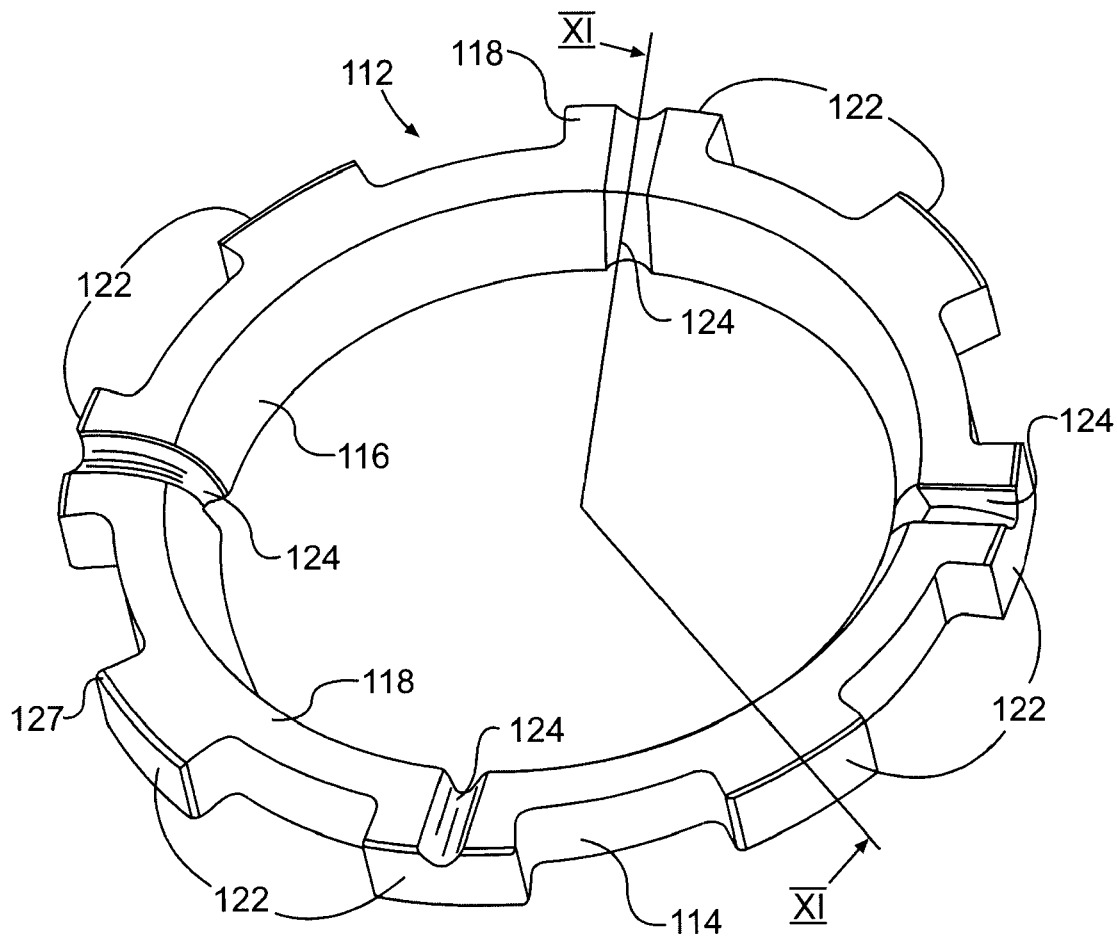
FIG. 10 is a perspective view of the insert shown in FIG. 6.
Figure 11:
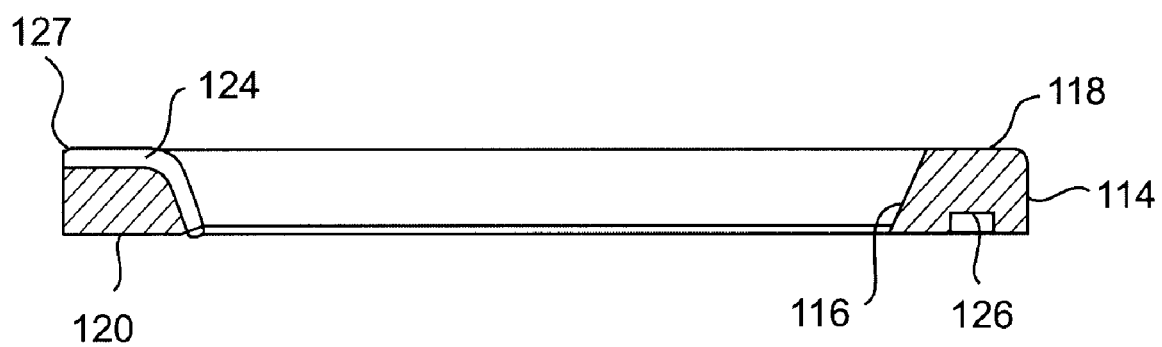
FIG. 11 is cross-sectional view taken along XI—XI of FIG. 9.

FIGS. 10 and 11 illustrate the insert 112 without the friction element 110. Generally, insert 112 and the friction element 110 have corresponding structure, although variations in structure are contemplated so long as the friction element 110 and the insert 112 are rotationally locked. The insert 112 includes an outer circumferential surface 114, an inner circumferential surface 116, a top surface 118 and a bottom surface 120. Preferably, the outer circumferential surface 114 is cylindrical, but other shapes and configurations are possible.

Preferably, the inner circumferential surface 116 is frusto-conical, but other shapes and configurations are possible. The frusto-conical shape of the inner circumferential surface 116 minimizes stress concentrations developed in the inner circumferential wall 130 and the radial wall 132 of the friction element 110. Forming the inner circumferential surface 116 as a frusto-conical surface also minimizes localized heat build-up at the junction of the inner circumferential wall 130 and the radial wall 132 of the friction element 110, which heat build-up could cause glazing on the clutch surface 106 and the brake surface 108 and undesirable noise in the coupling.

A plurality of insert projections 122 extend radially from and are circumferentially spaced about the outer circumferential surface 114. Each recess 138 of the friction element 110 mates with a respective insert projection 122 of the insert 112. The mating engagement of the recesses 138 with the projections 122 contributes to the rotational interlock between the insert 112 and the friction element 110.

A plurality of circumferentially spaced and radially extending grooves 124 extend along the top surface 118 and the inner circumferential surface 116. Although the number of grooves 124 can equal the number of insert projections 122, in this preferred embodiment, the number of grooves 124 is less than the number of insert projections 122. Each groove 124 is aligned with its respective insert projection 122. Each rib 140 is aligned with a corresponding groove 124 in the insert 112 so that the grooves 124 mate with the ribs 140. The mating engagement of the grooves 124 with the ribs 140 contributes to the rotational interlock between the insert 112 and the friction element 110.

Referring to FIGS. 7, 8 and 11, the bottom surface 120 of the insert 112 can include two pin alignment dimples 126 to facilitate alignment of the friction element 110 and the insert 112. As shown, each pin alignment dimple 126 partially extends into an adjacent projection 122 that does not include a groove 124. The pin alignment dimples 126 can be formed by conventional means such as being machined, molded, or punched.

Alignment dimples 126 can be used to orient the friction element 110 relative to the insert 112 so that the grooves 124 properly mate with the ribs 140 and the projections 122 properly mate with the recesses 138 when the insert 112 is inserted into the friction element 110. This assembly can be done manually or using an assembling robot.

Of course other conventional ways of aligning, such as visual or tactile alignment cues, are possible. For example, corresponding structure or markers on the friction element 110 and the insert 112 that are aligned to indicated proper alignment of the insert 112 relative to the friction element 110.

In this preferred embodiment, the insert 112 is molded from a powder metal material having the PMIF standard designation of FC-0208-50. Other suitable metals could include, for example, steel or a different combination of iron and copper from that specified by FC-0208-50. Other material capable of reinforcing the friction element 110 against loads/stresses and temperature levels experienced during operation of the coupling can be used. Other methods of manufacture can be used include die casting.

The insert 112 further includes a chamfered edge 127 formed around the outer edge of each of the projections 122 and the outer edge of the top surface 118. This chamfered edge is configured as a standard powder metal chamfer to facilitate proper tool operation during the forming of the insert 112.

After forming the insert 112, it is treated with a conventional brake shoe coating to prevent rust until the insert 112 is secured to the friction element 110. To overmold the insert 112 with the friction element 110, the insert 112 is placed in a mold sized for the friction element 110. The pin alignment dimples 126 are referenced to properly locate the insert 112 in the mold. The friction material is introduced into the mold under pressure and heat, which activates the adhesive in the friction material to bond the insert 112 to the friction element 110. If a conventional brake shoe coating that does not inhibit the bonding by the adhesive is chosen, then the brake shoe coating does not need to be cleaned from the insert 112 prior to overmolding the insert 112 with the friction material.

On this embodiment, when assembled, the bottom edge 144 of the friction element 110 is flush with the bottom surface 120 of the insert when the insert 112 is assembled into the friction element 110 as illustrated, for example, in FIG. 8. Referring to FIG. 8, the bottom surface 120 and the bottom edge 144, together, define the lower surface 104 of the friction member 100. The remainder of the insert 112 is covered by the friction element 110. As shown in FIG. 8, the insert 112 is in the volume defined by the inner and outer circumferential walls 128, 130, the radial wall 132 and the bottom edge 144 of the friction element 110. —Although in the preferred embodiment the insert is exposed, alternative constructions of the friction element and the insert can be used in accordance with the invention. For example, the insert can be encapsulated in the friction element—.

During operation of the coupling, the torque input through the clutch surface 106 or the brake surface 108 is outputted through the radial projections 102 and input to the axial projections 12a of the driven member 12. Due to the locations of the clutch surface 106 and the brake surface 108 relative to the projections 102, shear stresses develop in the friction member 100. The rotationally interlocking arrangement between the insert projections 122 and the recesses 138 and between the ribs 140 and the grooves 124 mechanically rotationally couples the insert 112 to the friction element 110 to transfer these stresses reliably between insert 112 and the friction element 110. This mechanical interlock deters relative motion between the insert 112 and the friction element 110 to provide a strong and durable connection between the friction element 110 and the insert 112. This arrangement ensures that the friction forces applied to the clutch surface 106 and the brake surface 108 are reliably transmitted through the friction member 100.

Referring now to friction element 200, FIGS. 12–14 illustrate friction member 200 which includes a friction element 210 and a core or insert 212. FIG. 12 shows the assembled friction member 200, while FIGS. 13 and 14, respectively, illustrate the friction element 210 alone and the insert 212. The friction element 210 and the insert 212 are similar to the friction element 110 and the insert 112 with the exception that this embodiment provides alternative structure for rotationally interlocking the friction element 210 and the insert 212.

With reference to FIG. 12, the friction member 200 has a plurality of radially extending projections 202 spaced along its circumference, a lower surface 204, a clutch surface 206 and a brake surface (not shown) like those of friction member 21 and friction member 100. In use with the coupling described above with reference to FIGS. 1–5, each of the plurality of radially extending projections 202 extends into a corresponding one of the spaces 12c and abuts the two adjacent axial projections 12a on the driven member 12. The axial projections 12a and the radial projections 202 rotationally secure the friction member 200 to the driven member 12.

The Belleville spring 22 contacts both the upper face 12b of the driven member 12 and a lower surface 204 of the friction member 200. This spring 22 biases the friction member 200 axially away from the driven member 12. The interaction of the axial projections 12a and the radial projections 202 permits the friction member 200 to be axially displaced relative to the driven member 12.

The clutch surface 206 provided on the inner circumference of the friction member 200 selectively engages the frusto-conical outer surface 14a on the drive hub 14. The clutch surface 206 also is frusto-conical. Forming this clutch surface 206 as a frusto-conical surface maximizes surface area with a minimum radial dimension. The spring 22 biases the clutch surface 206 into contact with the frusto-conical outer surface 14a of the drive hub 14. This frictional contact allows the drive hub 14 to drive the driven member 12, as discussed above with reference to FIGS. 1–5.

Like the friction member 100 discussed above, the brake surface (not shown) is provided on the upper surface (not shown) of the friction member 200. The brake surface (not shown) and the clutch surface 206 are provided on separate (the upper and the inside) surfaces of the friction member 200 to save space and minimize the number of elements needed for the coupling. Each braking surface shoe 23b of the brake member 23 selectively engages the brake surface (not shown) on the friction member 200 to retard the motion of the driven member 12 when the clutch surface 206 disengages from the hub drive 14, as discussed above with reference to FIGS. 1–5.

As shown in FIG. 12, the friction member 200 includes a friction element 210 and a core or insert 212 to reinforce the friction member 200 and its torque transmitting capabilites. As will be discussed in detail below, the friction element 210 and the insert 212 are preferably configured to matingly engage with one another to rotationally interlock the insert 212 and the friction element 210. In this embodiment, friction the element 210 and the insert 212 are interlocked by way of corresponding mating surfaces, specifically, recesses 238 and ribs 240 on the friction element 210 and projections 222 and grooves 224 on the insert 212, as discussed in more detail below.

FIG. 13 illustrates the friction element 210 without the insert 212. The friction element 210 includes an outer circumferential wall 228, an inner circumferential wall 230 and a radial wall 232 connecting the inner and outer circumferential walls 228, 230. The outer circumferential wall 228 includes the outer circumferential surface 214 of the friction member 200 and the inner circumferential wall 230 includes the clutch surface 206 of frictional element 200. The radial wall 232 includes the brake surface (not shown) of the friction member 200. Preferably, the channel surface 246 of the outer circumferential wall 228 is cylindrical, but other shapes and configurations are possible. Preferably, the inner circumferential wall 216 is cylindrical, but other shapes and configurations are possible.

The inner and outer circumferential walls 228, 230 and the radial wall 232 define a channel 234. The channel 234 receives the insert 212, as will be discussed below. A plurality of radial extensions 236 are spaced about the outer circumference of the friction element 210. The extension 236 are hollow and form a recess 238. A plurality of ribs 240 are formed on the friction element 210 and extend from the channel surface 242 toward a recess 238. The recesses 238 and the ribs 240 mechanically engage with corresponding structure on the insert 212 to rotationally interlock the insert 212 to the friction element 210, as explained detail below. Although the number of ribs 240 can equal the number of recesses 238, in this preferred embodiment, the number of ribs 240 is less than the number of recesses 238. Each rib 240 is aligned with its respective recess 238.

FIG. 14 illustrates the insert 212 without the friction element 210. Generally, the insert 212 and the friction element 210 have corresponding structure, although variations in structure are contemplated so long as the friction element 210 and the insert 212 are rotationally locked. The insert 212 includes an outer circumferential surface 214, an inner circumferential surface 216, a top surface (not shown) and a bottom surface 220. Preferably, the outer circumferential surface 214 is cylindrical, but other shapes and configurations are possible. Preferably, the inner circumferential surface 216 is cylindrical, but other shapes and configurations are possible.

A plurality of insert projections 222 extend radially from and are circumferentially spaced about the outer circumferential surface 214. Each recess 238 of the friction element 210 mates with a respective insert projection 222 of the insert 212. The mating engagement of the recesses 238 with the projections 222 contributes to the rotational interlock between the insert 212 and the friction element 210.

A plurality of circumferentially spaced and radially extending grooves 224 extend along the inner circumferential surface 216. Although the number of grooves 224 can equal the number of insert projections 222, in this preferred embodiment, the number of grooves 224 is less than the number of insert projections 222. Each groove 224 is aligned with its respective insert projection 222. Each rib 240 is aligned with a corresponding groove 224 in the insert 212 so that the grooves 224 receive the ribs 240. The mating engagement of the grooves 224 with the ribs 240 contributes to the rotational interlock between the insert 212 and the friction element 210.

The friction element 210 and the insert 212 are manufactured and assembled the same as the friction element 110 and insert 112 discussed above. In this embodiment, the rotationally interlocking arrangement between the insert projections 222 and the recesses 238 and between the ribs 240 and the grooves 224 mechanically couples the insert 212 to the friction element 210 to transfer the stresses reliably between the insert 212 and the friction element 210. As previously discussed, this mechanical interlock deters relative motion between the insert 212 and the friction element 210 to provide a strong and durable connection between the friction element 210 and the insert 212 so that the friction forces applied to the clutch surface 206 and the brake surface (not shown) are reliably transmitted through the friction member 100.

Although not illustrated in the drawings, as discussed above with reference to friction member 100, the insert 210 can include an alignment feature, such as, pin alignment dimples or other visual or tactile alignment arrangements on the friction element 210 and/or insert 212 as discussed above with respect to the friction member 100 of FIGS. 6–12.

In this embodiment, when assembled, the bottom edge 244 of the friction element 210 fits flush with the bottom surface 220 of the insert when the insert 212 is assembled into the friction element 210 as illustrated, for example in FIG. 12. Referring to FIG. 12, the bottom surface 220 and the bottom edge 244, together, define the lower surface 204 of the friction member 200. The remainder of the insert 212 is covered by the friction element 210.

Although preferred embodiments are discussed above, other rotationally interlocking connections between the friction element and the insert can be used, such as rivets, adhesives separate from that in the friction material, and clips formed on or attached to the insert that resiliently engage the friction element. Also, a combination of mechanical and chemical connections can be used to rotationally interlock the friction element to the insert.

It will be apparent to those skilled in the art that various modifications and variations can be made in the friction coupling of the present invention without departing from the spirit or scope of the invention. Thus, it is intended that the present invention covers the modifications and variations of this invention provided they come within the scope of the appended claims and their equivalents.

What is claimed is:

1. A torque transmitting element for use in an apparatus driven by a prime mover, the torque transmitting element comprises:
    a friction element including:
        a first friction engagement surface;
        a second friction engagement surface in a different plane from the first friction engagement surface;
        a third surface; and
        at least one torque transmitter outputting a torque being input through one of the first and second friction engagement surfaces, the at least one torque transmitter being on the third surface; and
    an insert reinforcing transmission of the torque through the friction element from the one of the first and second friction engagement surfaces to the torque transmitter, the reinforcing insert being secured to the friction element between the third surface and one of the first and second friction engagement surfaces.

2. The torque transmitting element according to claim 1, wherein a volume circumscribes the friction element; and the insert is in the volume.

3. The torque transmitting element according to claim 1, wherein the friction element is made from friction material and the insert is metallic.

4. The torque transmitting element according to claim 1, wherein the friction element is made from friction material and the insert is made from powder metal.

5. The torque transmitting element according to claim 1, wherein the insert is encapsulated in the friction element.

6. The torque transmitting element according to claim 1, wherein at least a portion of the insert is exposed.

7. The friction coupling according to claim 1, wherein the insert has at least one surface projection engaging the friction element.

8. The friction coupling according to claim 1, wherein the friction element is a lining secured to the insert.

9. A torque transmitting element for use in an apparatus driven by a prime mover, the torque transmitting element comprises:
    a friction element including:
        a first friction engagement surface;
        a second friction engagement surface in a different plane from the first friction engagement surface;
        a third surface; and
        at least one torque transmitter on the third surface; and
    an insert secured to the friction element between the third surface and one of the first and second friction engagement surfaces, wherein the insert further includes:
        an inner peripheral surface; and
        an outer peripheral surface including at least one projection; and
    the friction element further includes:
        an outer peripheral wall including:
            an outer surface;
            a rear surface on the other side from the outer surface; and
            at least one recess on the rear surface aligned with the at least one projection on the insert.

10. The friction coupling according to claim 9, wherein the at least one recess is aligned with and extends into the at least one projection on the third surface.

11. The torque transmitting element according to claim 1, further including means for rotationally locking the insert to the friction element.

12. The torque transmitting element according to claim 1, wherein the friction element includes a first mating surface; the insert includes a second mating surface; and at least one of the first and second mating surfaces includes a projection and the other of the first and second mating surfaces includes a recess receiving the projection.

13. The torque transmitting element according to claim 1, further comprising an interlocking member disposed on at least one of the friction element and the insert.

14. A torque transmitting element for use in an apparatus driven by a prime mover, the torque transmitting element comprises:
    a friction element including:
        a first friction engagement surface;
        a second friction engagement surface in a different plane from the first friction engagement surface;

a third surface; and
at least one torque transmitter on the third surface; and
an insert secured to the friction element between the third surface and one of the first and second friction engagement surfaces, wherein the insert further includes:
an inner peripheral surface including at least one groove; and
an outer peripheral surface; and
the friction element further includes at least one rib received in the at least one groove.

15. The friction coupling according to claim 14, wherein the at least one groove is aligned with the at least one projection of the insert.

16. A torque transmitting element for use in an apparatus driven by a prime mover, the torque transmitting element comprises:
a friction element including:
a first friction engagement surface;
a second friction engagement surface in a different plane from the first friction engagement surface;
a third surface; and
at least one torque transmitter on the third surface; and
an insert secured to the friction element between the third surface and one of the first and second friction engagement surfaces;
wherein the friction element is annular and further includes:
an outer circumferential wall;
an inner circumferential wall; and
a radial wall extending between the outer and inner circumferential walls;
the radial wall, the outer circumferential wall and the inner circumferential wall form a channel; and
the insert is received in the channel.

17. A torque transmitting element for use in an apparatus driven by a prime mover, the torque transmitting element comprises:
a friction element including:
a first friction engagement surface;
a second friction engagement surface in a different plane from the first friction engagement surface;
a third surface; and
at least one torque transmitter on the third surface;
an insert secured to the friction element between the third surface and one of the first and second friction engagement surfaces; and
a torsional vibration damper secured to at least one of the friction element and the insert.

18. A brake and clutch assembly for a power apparatus comprising:
an engine output member;
a driven member; and
a coupling having a first position and a second position, the coupling comprising:
a friction member connected to one of the engine output member and the driven member, the friction member including:
a brake surface and a clutch surface in a different plane from the brake surface; and
an insert disposed intermediate the clutch surface and the brake surface;
a spring located between the friction member and the one of the engine output member and the driven member;
a brake member proximate to the brake surface; the brake member mounted relative to the friction member to permit relative rotation; and
a brake actuator connected to the brake member;
the clutch surface being disengaged from the other one of the engine output member and the driven member and the brake member being engaged with the brake surface when the coupling is in the first position and the clutch surface is engaged with the other one of the engine output member and the driven member and the brake member is disengaged from the brake surface when the coupling is in the second position;
the insert reinforcing transmission of torque being input to the clutch surface when the clutch surface is engaged with the other one of the engine output member and the driven member and reinforcing transmission of torque being input to the brake surface when the brake member is engaged with the brake surface.

19. The brake and clutch assembly according to claim 18, wherein the insert is encapsulated in the friction member.

20. The brake and clutch assembly according to claim 18, wherein a portion of the insert is exposed.

21. A brake and clutch assembly for a power apparatus comprising:
an engine output member;
a driven member; and
a coupling having a first position and a second position, the coupling comprising:
a friction member connected to one of the engine output member and the driven member, the friction member including:
a brake surface and a clutch surface in a different plane from the brake surface; and
an insert disposed intermediate the clutch surface and the brake surface;
a spring located between the friction member and the one of the engine output member and the driven member;
a brake member proximate to the brake surface; the brake member mounted relative to the friction member to permit relative rotation; and
a brake actuator connected to the brake member;
the clutch surface being disengaged from the other one of the engine output member and the driven member and the brake member being engaged with the brake surface when the coupling is in the first position and the clutch surface is engaged with the other one of the engine output member and the driven member and the brake member is disengaged from the brake surface when the coupling is in the second position;
wherein the one of the engine output member and the driven member includes a plurality circumferentially spaced axial projections;
the friction member is annular and further includes:
a plurality of circumferentially spaced radial projections, each of the radial projections extending between a respective pair of the axial projections;
an outer circumferential wall;
a frusto-conical inner circumferential wall including at least one projection extending toward the outer circumferential wall; and
a radial wall connecting the inner and outer circumferential walls;
the clutch surface is located on the inner circumferential wall and the brake surface is located on the radial wall;
the outer circumferential wall, the inner circumferential wall and the radial wall forming a channel;
at least one rib extending across the channel; and at least one recess in the channel extending into one of the plurality of radial projections; and the insert is annular and is received in the channel, the insert further includes:

at least one groove receiving the at least one rib; and at least one radial projection extending from the outer circumference of the insert and into the at least one recess.

22. The blade brake and clutch assembly according to claim 21, wherein the friction member further includes a torsional vibration damper secured to at least one of the plurality of radial projections.

23. A torque transmitting element for use in an apparatus driven by a prime mover, the torque transmitting element comprises:

a friction element including:

a first friction engagement surface;

a second friction engagement surface in a different plane from the first friction surface;

a third surface; and at least one torque transmitter on the third surface; and means for reinforcing the transmission of torque from at least one of the first and second friction engagement surfaces, said reinforcing means is secured to the friction element between the third surface and the at least one of the first friction surface and the second friction surface.

24. The torque transmitting element according to claim 23, wherein the reinforcing means further includes means for rotationally locking the reinforcing means to the friction element.

25. The torque transmitting element according to claim 23, wherein at least one of the reinforcing means and the friction element includes means for damping torsional vibrations.

* * * * *